J. G. HOULSWORTH.
Millstone-Feeding Device.
No. 223,514. Patented Jan. 13, 1880.
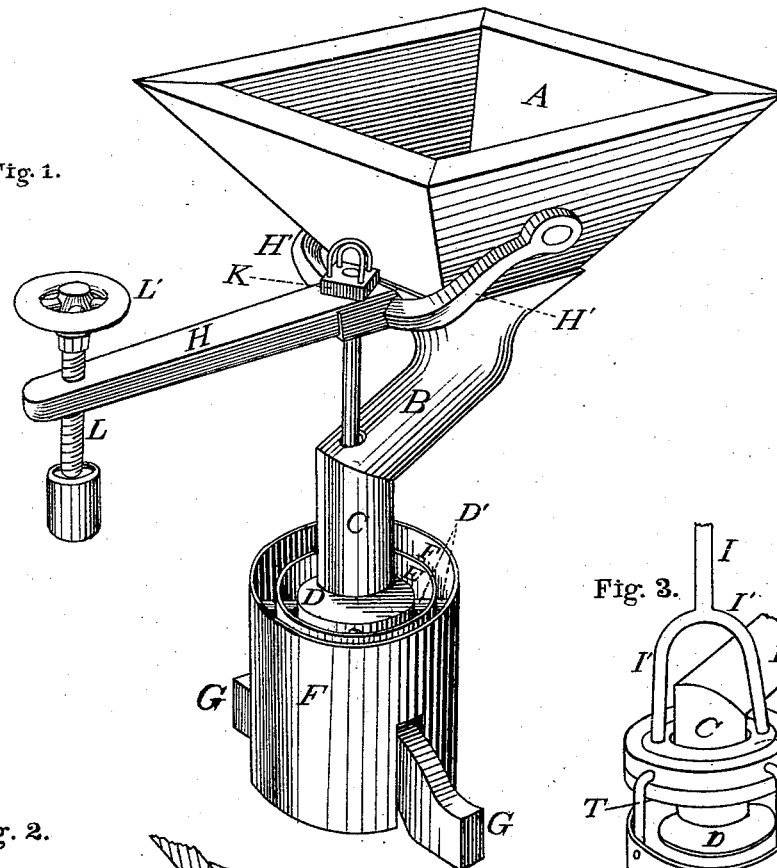
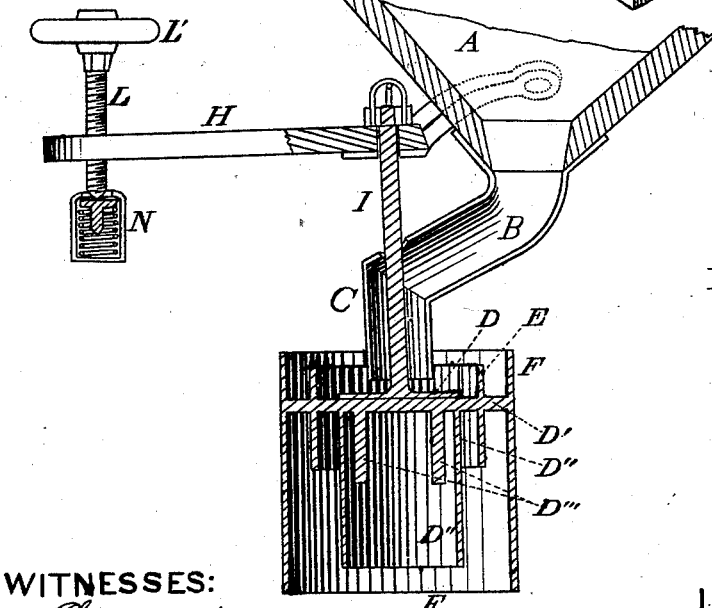
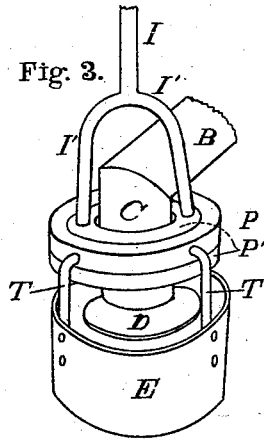
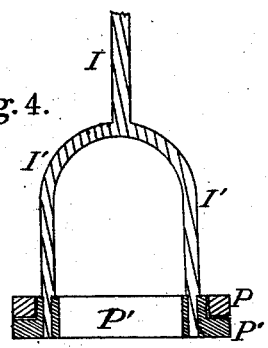
WITNESSES:
Thomas Hoge
Norval Hoge
INVENTOR:
John G. Houlsworth

UNITED STATES PATENT OFFICE.

JOHN G. HOULSWORTH, OF JEFFERSON, PENNSYLVANIA.

MILLSTONE-FEEDING DEVICE.

SPECIFICATION forming part of Letters Patent No. 223,514, dated January 13, 1880.

Application filed June 20, 1879.

*To all whom it may concern:*

Be it known that I, JOHN G. HOULSWORTH, of Jefferson, in the county of Greene and State of Pennsylvania, have invented an Improved Feed for Millstones, of which the following is a specification.

My invention consists in the means described, and particularly pointed out in the claim.

In the accompanying drawings, forming part of this specification, similar letters refer to similar parts, Figure 1 being a perspective view of my invention, and Fig. 2 a vertical section through the center of the same.

In Fig. 1, A represents the ordinary mill-hopper, (the supporting hopper-frame being removed to show the working parts more clearly,) from which the grain to be ground descends through the sloping box or tube B, through which it will flow and fill the vertical part of the tube C full, or nearly full, without its receiving the weight or direct pressure of the grain in the hopper, the length and inclination of the part B being so adjusted as to produce that result, which I find is done perfectly by the arrangement shown, filling the tube C the same height all the time, no difference what the depth of grain may be in the hopper or tube above the inclined part B.

The vertical section of the tube C becomes in effect a small secondary hopper filled to a uniform depth from the first or main hopper or other source, and it may be constructed with open top, funnel-shaped, or otherwise, as desired, the object being to furnish a small unvarying supply of grain, which is supplied through an inclined tube, spout, or trunk coming from the hopper or sink A, located in a hopper-frame in the usual mode, or elsewhere, as convenience may require. From this uniform quantity and pressure of grain in this receptacle C the outflow or feed through the annular opening, between its lower end and the horizontal plate or valve-disk D, will be uniform while that orifice remains the same size.

In the common mode of construction the plate D is rigidly attached to the balance-rynd G, or forms part of the "buck-head," when such is used, in each case being rigidly attached to the upper or runner millstone, so that whenever the stone is raised a little to make it grind coarser it thereby shuts off a portion of the feed by bringing the plate D as much closer to the end of the tube C as the amount the stone is elevated. Conversely, whenever the stone is lowered to grind finer, the amount of feed is increased proportionately, while it is desirable that it should remain unchanged, or be affected directly the opposite to this; and it is especially desirable to have the feed unaffected by and independent of any movement of setting the stones; and this latter object I accomplish by having the plate D disconnected from the millstone and rigidly attached to the rod or shaft I, passing through and supported by the lever H, which is raised and lowered with the shaft I and plate D by means of a suitable set-screw, L, screwed through one end, while the other end terminates in forked arms H', pivoted at their ends to the sides of the hopper, as shown, or to the hopper-frame or other suitable attachment, serving as a fulcrum for the lever.

The plate D and all its attachments being disconnected from the millstone and simply set loosely in its eye, it is not affected by any movement of raising or lowering the stone in setting the same.

The point of the set-screw L rests upon a disk or cap which is supported upon a spiral spring inclosed in a suitable case, N, which is set into the front cross-piece of the hopper-frame, attached to the mill-hoop or other suitable support.

The tension of the spring is such as to hold or press the cap against the top flange of the case N with sufficient force to always hold it in that position and support the weight of the lever H, shaft I, and plate D with its weight of grain in the tube C, in whatever position they are set by the adjusting-screw L, except in case when any large hard object should find its way into the tube C, when, if caught between the bottom of the tube C and the plate D, the extra force against D will cause the spring to yield, which allows the plate D to be lowered momentarily until said object passes out from under the tube C without choking or injuring it, after which the spring immediately raises all parts to exactly their former position, the upward movement being limited by the cap on the spring coming in contact with the inturned flange in the top of the case N or other suitable bearing or stop for the limit of the upward movement produced by the spring.

The plate D may be made with or without the flange or tube D" projecting from its lower edge to assist in guiding the grain in its descent.

Just outside of the edge of the plate D is placed an encircling band or tube, E, to act as a deflector to stop the outward motion or centrifugal force of the grain, and to cause it to fall perpendicularly through the annular space between D and E. The tube E may descend to near the bottom or lower face of the stone, as shown, or it may be cut off at a point half-way up, or more, only extending far enough below the edge of D to be sure to prevent the outward motion of the grain from carrying it out against the inside of the eye of the stone, which being considerably larger than the tube E, the centrifugal force on it is greater, sometimes causing the grain to adhere to or swing around in it, as is well known to all millers.

The outer casing, F, fits loosely inside of the eye of the millstone, and is not required where the inner surface of the eye is already lined with a smooth even surface of metal or enamel. When used, it and the other tubes have suitable cuts upward from their lower edges, to allow them to pass loosely over the balance-rynd G, the driver, and other obstructions, so that they can be all dropped in together from the top astraddle the parts named, the tubes F, E, and D" being fastened by solder or otherwise to the cross wires or rods D', which are fastened to the plate D and shaft I, thus forming all the parts into one connected whole, which is all raised or lowered in the eye by the set-screw L, as before stated, and which makes it all independent of any movement of the millstone or burr except its rotary motion, which is communicated to it by means of two studs, D''', which pass through loosely-fitting eyes in suitable lugs attached to the balance-rynd G, or simply placed astraddle the balance-rynd, or through holes in the top of the buck-head, or otherwise, to impart the rotary motion of the burr to the plate D, to assist in the regular feeding of the grain over its top surface.

The diameter of the plate D and of the tube E should be made as small as consistent with other requirements, to avoid as much of the centrifugal force as possible by keeping the grain near the center of motion in passing through the eye.

The use of this rotating shaft I also furnishes a most convenient means of ringing an alarm-bell when the hopper runs empty, by simply inserting suitable knockers, as shown, in the nut K on the top of the shaft I, and suspending the bell over them by a strap, which allows the bell to descend enough to be hit by them whenever the hopper runs empty by the means usually employed for that purpose.

The open spaces inside and outside of the tube E give free access for the circulation or draft of air through the burrs.

In practice, I find in grinding damp corn with much "silk" in it that it occasionally adheres to the shaft I, and is wound around it in the bottom of the tube C, sometimes tending to obstruct the free passage of the grain through the tube C. To avoid this difficulty (which only occurs with the chopper-stones) I divide the shaft I into two or more forked arms, I', which pass down astraddle the tube B and outside of the tube C, as shown in perspective in Fig. 3, and terminate in the band P', encircling the tube C.

The band P' has a rabbet or groove in its upper side and outer edge, into which another band, P, fits loosely, as is more clearly shown in vertical cross-section in Fig. 4. From this band P three or more rods, T, descend to and are riveted or otherwise attached to the tube or band E outside of the valve-plate D, as shown; or the ring or band P may be attached to the tube F or other part which is connected rigidly to the valve-plate D, so that when the shaft I is raised or lowered it also raises or lowers the plate D by such connection, and thus regulates the feed, as in the other construction.

The rotary motion of the plate D and tubes E and F is communicated through the connecting-rods T to the band P, which rotates upon P' as a bearing, while it and the rods I' and I remain stationary to prevent their conflicting with the tube B.

I am aware that inclined tubes or spouts have been used before in mill-feeding apparatus of different kinds for the purpose of conducting the grain to or from the hopper or from one receptacle to another, and for that purpose alone; but I use the inclined portion in the tube for the purpose of getting a uniform pressure of grain in the feed-orifice by giving the proper slope to the incline, and using it in connection with a short vertical portion, which is filled only to a uniform depth by the inclined portion, which gives said uniform weight or pressure on the feed-orifice.

I claim—

In a feed-regulating apparatus for grinding-mills, the combination of the hopper A, its discharge-tube B C, composed of an inclined and vertical section, to form a feed-equalizing elbow, and the feed-plate D, with means for its adjustment independent of the balance-rynd, by which it is driven, as set forth, and for the purpose described.

JOHN G. HOULSWORTH.

Witnesses:
THOMAS HOGE,
J. H. CARSON.